US008708380B2

(12) United States Patent
Tsuchida et al.

(10) Patent No.: US 8,708,380 B2
(45) Date of Patent: Apr. 29, 2014

(54) BUMPER REINFORCEMENT (71) Applicants: Aisin Seiki Kabushiki Kaisha, Kariya (JP); Aisin Keikinzoku Kabushiki Kaisha, Imizu (JP)

(72) Inventors: Yasuhisa Tsuchida, Nagoya (JP); Kiyoichi Kita, Okazaki (JP); Tamaki Obayashi, Toyama (JP); Kyosuke Matsui, Chiryu (JP)

(73) Assignees: Aisin Seiki Kabushiki Kaisha, Kariya-shi (JP); Aisin Keikinzoku Kabushiki Kaisha, Imizu-shi (JP)

( * ) Notice: Subject to any disclaimer, the term of this patent is extended or adjusted under 35 U.S.C. 154(b) by 0 days.

(21) Appl. No.: 13/667,390

(22) Filed: Nov. 2, 2012

(65) Prior Publication Data

US 2013/0113224 A1    May 9, 2013

(30) Foreign Application Priority Data

Nov. 4, 2011    (JP) .................................. 2011-242034

(51) Int. Cl.
*B60R 19/02*    (2006.01)
(52) U.S. Cl.
USPC ......................................................... 293/102
(58) Field of Classification Search
USPC .................... 293/102, 133, 154, 155
See application file for complete search history.

(56) References Cited

U.S. PATENT DOCUMENTS

| | | | | |
|---|---|---|---|---|
| 6,042,163 A | * | 3/2000 | Reiffer ......................... | 293/155 |
| 6,918,621 B2 | * | 7/2005 | Seksaria ....................... | 293/133 |
| 6,986,536 B1 | * | 1/2006 | Heatherington et al. ..... | 293/102 |
| 2012/0025545 A1 | | 2/2012 | Haneda et al. | |

FOREIGN PATENT DOCUMENTS

| | | |
|---|---|---|
| JP | 2006-151095 | 6/2006 |
| JP | 2006-176093 | 7/2006 |
| JP | 2012-30722 | 2/2012 |

* cited by examiner

*Primary Examiner* — Dennis H Pedder
(74) *Attorney, Agent, or Firm* — Oblon, Spivak, McClelland, Maier & Neustadt, L.L.P.

(57) ABSTRACT

A bumper reinforcement includes end portions and an intermediate portion, wherein the bumper reinforcement is made of a light alloy extruded material including a hollow cross-section and is configured to be arranged at a vehicle, the bumper reinforcement is configured to be assembled on and supported by a supporting member at each of the end portions bent toward a vehicle body side, the hollow cross-section includes a closed cross-section at the intermediate portion and includes an open cross-section provided with an opening at each of the end portions, each of the end portions is formed in a manner that a thickness of the hollow cross-section thereof in a vehicle front-rear direction is gradually reduced toward an end, and each of the openings is configured to be at least partially closed with a connecting portion of the supporting member and is restricted from being expanded.

6 Claims, 5 Drawing Sheets

BUMPER REINFORCEMENT

CROSS REFERENCE TO RELATED APPLICATIONS

This application is based on and claims priority under 35 U.S.C. §119 to Japanese Patent Application 2011-242034, filed on Nov. 4, 2011, the entire content of which is incorporated herein by reference.

TECHNICAL FIELD

This disclosure generally relates to a bumper reinforcement.

BACKGROUND DISCUSSION

A known bumper reinforcement used for a bumper apparatus for a vehicle is disclosed in JP2006-151095A (hereinafter referred to as Patent reference 1). The known bumper reinforcement disclosed in Patent reference 1 is made of aluminum alloy extruded material and includes a hollow cross-section, and is arranged at a vehicle to extend in a width direction thereof. The known bumper reinforcement includes end portions each of which is bent toward a vehicle body in a bending process. The known bumper reinforcement is mounted on a supporting member at the end portions and is supported by the supporting members. The supporting member may correspond to a side member of the vehicle body or a stay (alternatively, a crush box for absorbing an impact or a shock by crushing may be used) attached to the side member.

The known bumper reinforcement disclosed in Patent reference 1 is made of the aluminum alloy extruded material including the hollow cross section and is arranged at the vehicle to extend in the width direction thereof. The known bumper reinforcement includes a body portion of which end portions are bent toward the vehicle body and a pair of reinforcement members joined to vehicle-exterior-side-end-portions of the body portion. According to the known bumper reinforcement, a diagonally-cut-off portion (that is, the cut-off portion where an amount of cut-off increases gradually toward an end of the vehicle-exterior-side-end-portion) is formed at each vehicle-exterior-side-end-portion at which the bending is applied, and a reinforcement member is joined to each diagonally-cut-off portion. Thus, an inclined surface that matches design of the vehicle is obtained without bending the end portions of the body portion to a great extent. In addition, a strength reduction involved in cutting off the end portions of the body portion is compensated for by the reinforcement members joined to the diagonally-cut-off portion.

According to the known bumper reinforcement disclosed in Patent reference 1, the reinforcement members need to be joined to the diagonally-cut-off portion provided at each end portion of the body portion by means of welding or a mechanical connection, and thus the number of parts and a manufacturing workload increase, which may lead to cost increase. In addition, a shape or configuration of the diagonally-cut-off portion may deteriorate because the reinforcement members are joined to the vehicle-exterior-side-end-portions of the body portion.

A need thus exists for a bumper reinforcement which is not susceptible to the drawback mentioned above.

SUMMARY

According to an aspect of this disclosure, a bumper reinforcement includes end portions and an intermediate portion provided between the end portions, wherein the bumper reinforcement is made of a light alloy extruded material including a hollow cross-section and is configured to be arranged at a vehicle to be extended in a vehicle width direction, the bumper reinforcement is configured to be assembled on and supported by a supporting member at each of the end portions bent toward a vehicle body side, the hollow cross-section of the light alloy extruded material includes a closed cross-section at the intermediate portion and includes an open cross-section provided with an opening formed at the vehicle body side of the hollow cross-section at each of the end portions, each of the end portions is formed in a manner that a thickness of the hollow cross-section of each of the end portions in a vehicle front-rear direction is gradually reduced toward an end of each of the end portion, and each of the openings is configured to be at least partially closed with a connecting portion of the supporting member and is restricted from being expanded.

According to another aspect of this disclosure, a vehicle bumper apparatus includes a bumper reinforcement and a supporting member, wherein the bumper reinforcement is made of a light alloy extruded material including a hollow cross-section and configured to be arranged at a vehicle to be extended in a vehicle width direction, the bumper reinforcement includes end portions each of which is bent toward a vehicle body side, the end portions of the bumper reinforcement are configured to be assembled on the vehicle body via the supporting member, the hollow cross-section of the light alloy extruded material of the bumper reinforcement includes a closed cross-section at an intermediate portion provided between the end portions and includes an open cross-section provided with an opening formed at the vehicle body side of the hollow cross-section at each of the end portions, each of the end portions is formed in a manner that a thickness of the hollow cross-section of each of the end portions in a vehicle front-rear direction is gradually reduced toward an end of each of the end portion, and the supporting member includes a connecting portion, and each of the openings of the bumper reinforcement is at least partially closed with the connecting portion and is restricted from being expanded.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
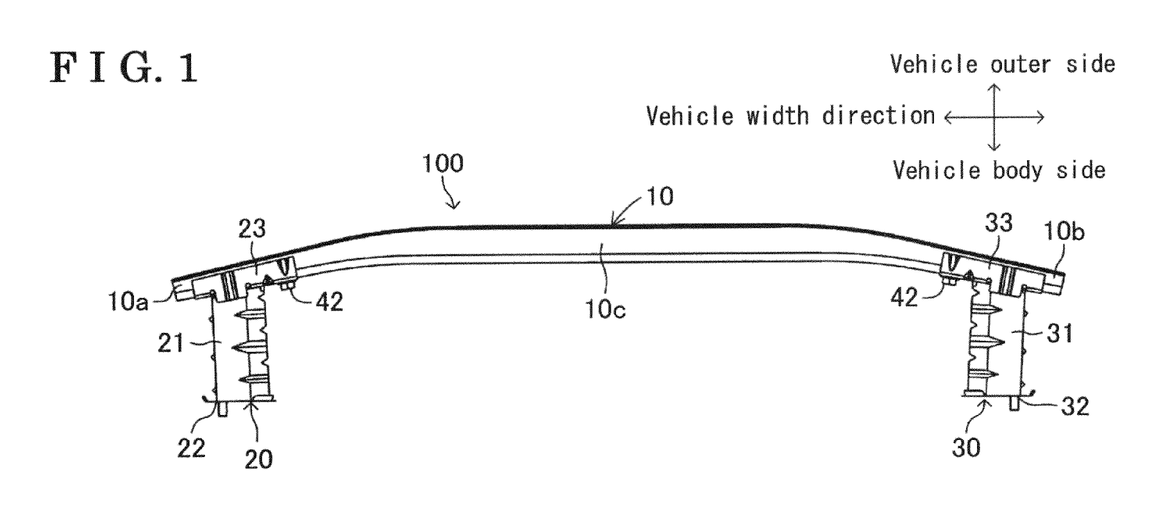
FIG. 1 is a top plan view illustrating a bumper reinforcement according to an embodiment disclosed here.
Figure 2:
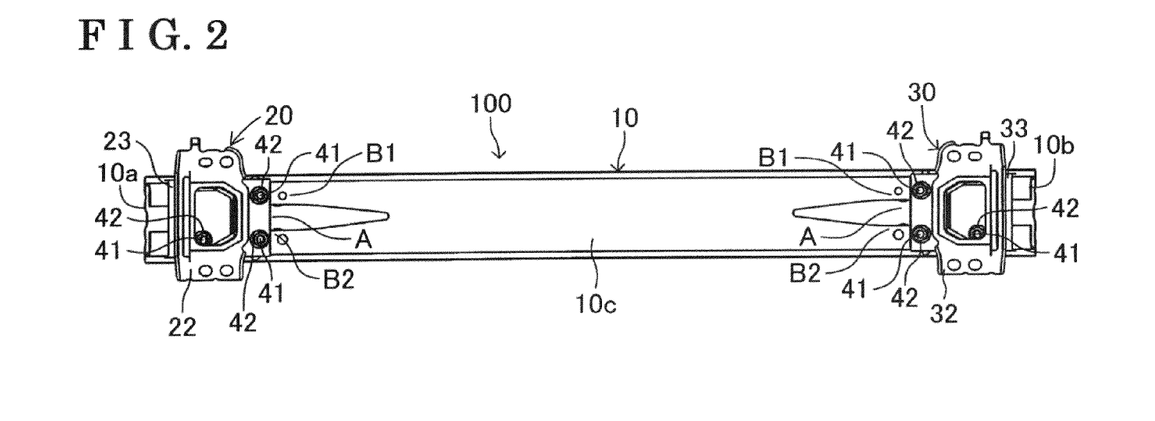
FIG. 2 is a rear view of the bumper reinforcement and crush boxes illustrated in FIG. 1.
Figure 3:
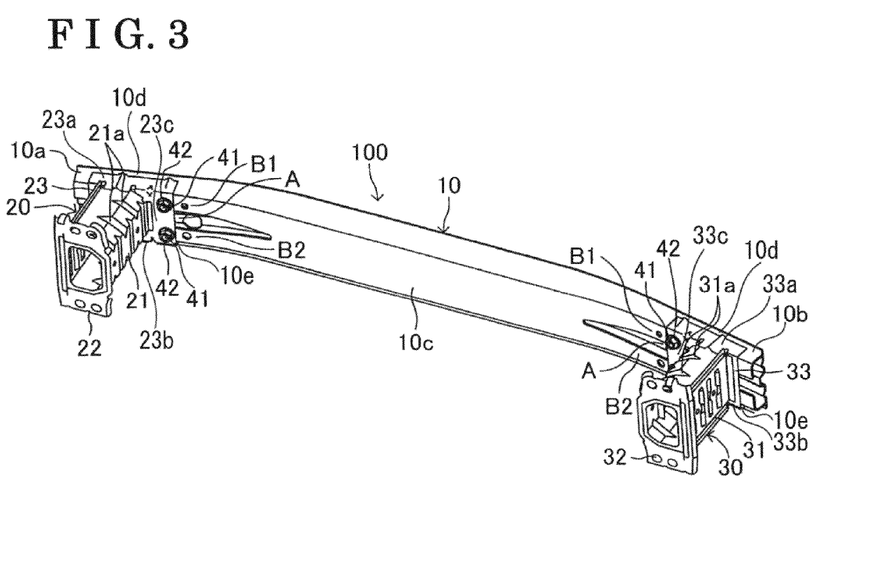
FIG. 3 is a rear perspective view of the bumper reinforcement and the crush boxes illustrated in FIG. 1.
Figure 4:
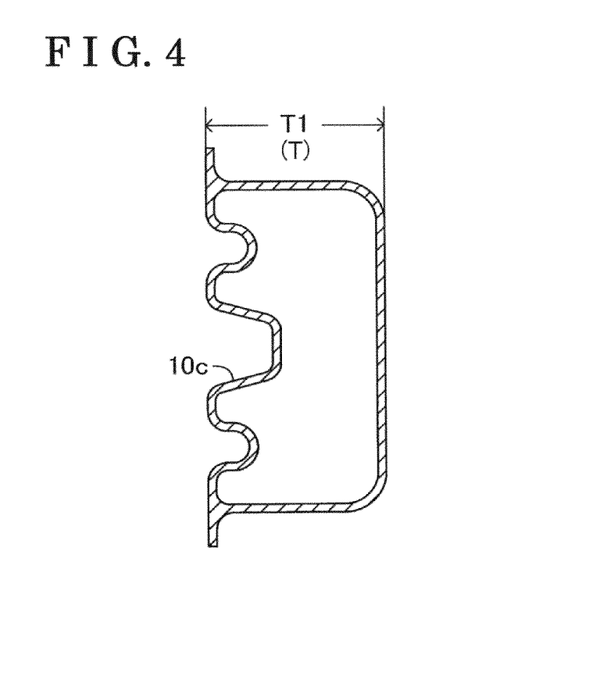
FIG. 4 is an enlarged sectional view of a central portion of the bumper reinforcement illustrated in FIGS. 1 to 3 in a width direction of a vehicle on which the bumper reinforcement is configured to be mounted.

An embodiment of this disclosure will be explained as follows with reference to the illustrations of the attached drawings. Each of FIGS. 1 to 3 illustrates a vehicle bumper apparatus 100 provided with a bumper reinforcement 10 and with crush boxes 20, 30 provided as a pair on the left and right, according to the embodiment of the disclosure. The vehicle bumper apparatus 100 according to the embodiment is configured to be arranged at a front side of a vehicle. The vehicle bumper apparatus 100 is configured so that the bumper reinforcement 10 made of aluminum alloy extruded material and having an elongated shape is mounted on side members of a vehicle body and supported thereat via the crush boxes 20, 30. The side members of the vehicle body are arranged at respective lateral side portions of the vehicle in a width direction of the vehicle (in a vehicle width direction). Each of the side members has a relatively high rigidity in a front-rear direction of the vehicle (in a vehicle front-rear direction), compared to rigidities of other portions of the vehicle body in the vehicle front-rear direction.

In a case where a load is applied to the vehicle, the crush boxes 20, 30 are crushed by the load in the vehicle front-rear direction and therefore absorb an impact energy caused by the load. The crush boxes 20, 30 are arranged at front sides of the side members, respectively, so as to extend along the vehicle front-rear direction. The crush boxes 20, 30 include main body portion 21, 31 each formed in a tubular shape, vehicle body attaching portions 22, 32, and bumper attaching portions 23, 33. The main body portions 21, 31 are positioned at respective intermediate portions of the crush boxes 20, 30 in the vehicle front-rear direction and are arranged in the vehicle front-rear direction. The vehicle body attaching portions 22, 32 are arranged at respective rear sides of the main body portions 21, 31 and are fixedly attached to the main body portions 21, 31. The bumper attaching portion 23, 33 are arranged at respective front sides of the main body portions 21, 31 and are fixedly attached to the main body portions 21, 31.

Figure 10:
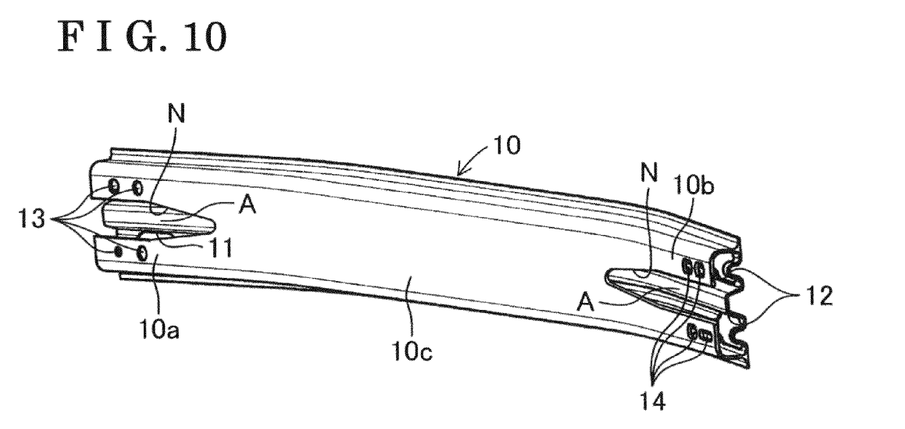
FIG. 10 is a perspective view illustrating a state where each of the end portions of the bumper reinforcement according to the embodiment is provided with insertion holes and bolt attaching holes.

Each of the main body portions 21, 31 is formed so as to have a polygonal shape (for example, a hexagonal shape) in a vertical cross-section. Plural beads 21a, 31a are arranged at desired portions of the main body portions 21, 31, respectively. The vehicle body attaching portions 22, 32 are fixed by welding to respective rear end portions of the main body portions 21, 31 and are configured to be attached to respective front end portions of the side members. Each of the bumper attaching portions 23, 33 includes a vertical plate portion 23c, 33c which is along, that is, conforms to, a rear surface of the bumper reinforcement 10, an upper plate portion 23a, 33a which is along, that is, conforms to, an upper surface of the bumper reinforcement 10, and a lower plate portion 23b, 33b which is along, that is, conforms to, a bottom surface of the bumper reinforcement 10, so that each of the bumper attaching portions 23, 33 is formed to have a three-sided rectangular shape. The bumper attaching portions 23, 33 are fixed by welding to respective front end portions of the main body portions 21, 31. In addition, each of the bumper attaching portions 23, 33 is attached to the bumper reinforcement 10 by, for example, three bolts 41 and three nuts 42. The nuts 42 are fixed by welding to respective rear surfaces of the vertical plate portion 23c, 33c of the bumper attaching portions 23, 33. The bolts 41 are threadedly engaged with or screwed into the respective nuts 42 through bolt insertion holes 11, 12 and bolt attaching holes 13, 14 which are provided at the bumper reinforcement 10 (refer to FIG. 10), thereby, the crush boxes 20, 30 and the bumper reinforcement 10 are integrally connected to each other.

The bumper reinforcement 10 is arranged to extend in the vehicle width direction and is supported, at end portion 10a, 10b of the bumper reinforcement 10, by the crush boxes 20, 30 which are provided as a pair on the left and right. As illustrated in FIGS. 1 to 4, a hollow cross-section of an intermediate portion 10c which is provided between the end portions 10a, 10b and which has a linear configuration corresponds to a closed cross-section, and the closed cross-section is uniform in a lengthwise direction of the intermediate portion 10c. As illustrated in FIGS. 1 to 3 and 5, the hollow cross-section of each of the end portions 10a, 10b corresponds to an open cross-section including an opening A formed at a vehicle body side of the hollow cross-section. Each of the end portions 10a, 10b is formed to include a gradual change in a thickness T of the hollow cross-section in the vehicle front-rear direction so that the thickness T is set to be reduced gradually toward an end of each of the end portion 10a, 10b. The thickness T of the hollow cross-section is set to be T1 at a substantially central portion of the intermediate portion 10c (refer to FIG. 4), and is set to be T2 (T1>T2) at a substantially central portion of each of the end portion 10a, 10b (refer to FIG. 5).

According to the bumper reinforcement 10 of the embodiment, as illustrated in FIGS. 2 and 3, an intermediate portion of each opening A in the vehicle width direction is at least partially closed with the vertical plate portions 23c, 33c of the bumper attaching portions 23, 33 of the crush boxes 20, 30 in order to restrict each opening A from being expanded. Each of the vertical plate portion 23c, 33c of the bumper attaching portions 23, 33 serves as a connecting portion connecting a vertical wall B1 of each of the end portions 10a, 10b and a vertical wall B2 of each of the end portions 10a, 10b. The vertical wall B1 and the vertical wall B2 are positioned above and below the opening A, respectively. At each portion of the bumper reinforcement 10 at which the bumper reinforcement 10 is assembled on the crush boxes 20, 30, an upper wall portion 10d and a lower wall portion 10e of the bumper reinforcement 10 are retained or held (in a sandwiched manner) by upper plate portions 23a, 33a (retaining portions) and lower plate portions 23b, 33b (the retaining portions) of the bumper attaching portions 23, 33 (in a manner that the upper wall portion 10d and the lower wall portion 10e are sandwiched between the upper plate portions 23a, 33a and the lower plate portions 23b, 33b). The expression "retained in a sandwiched manner between one member and the other member" used herein includes a state where a clearance is provided between the one member and the other member.

Figure 5:
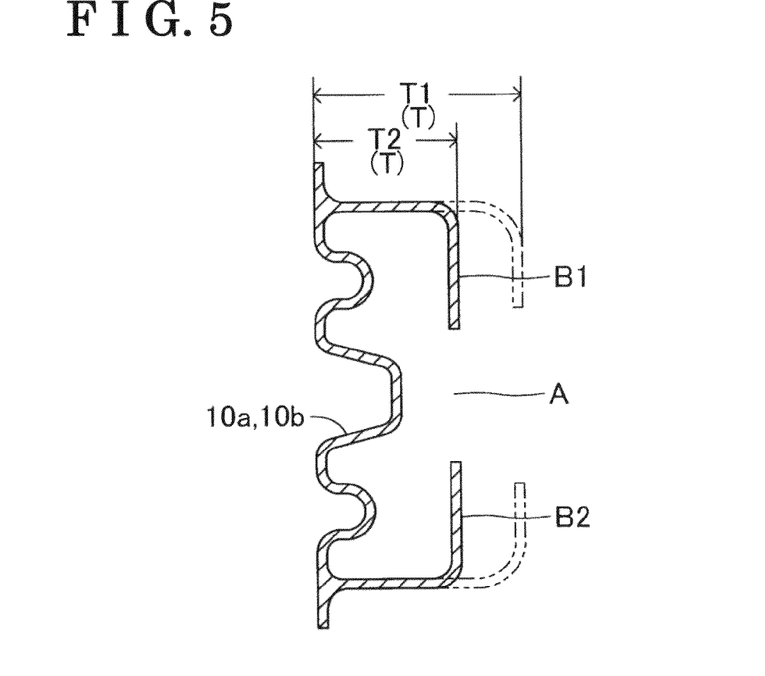
FIG. 5 is an enlarged sectional view of attachment portions (end portions) of the bumper reinforcement illustrated in FIGS. 1 to 3, which are to be attached to the crush boxes.
Figure 6:
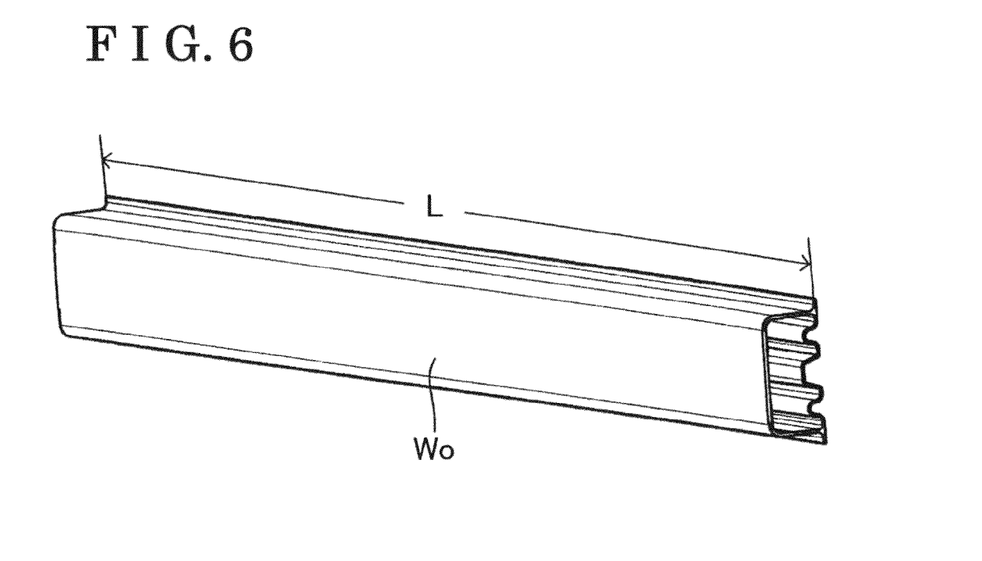
FIG. 6 is a perspective view schematically illustrating a raw material (an aluminum alloy extruded material having a hollow cross-section) of the bumper reinforcement illustrated in FIGS. 1 to 3.
Figure 7:
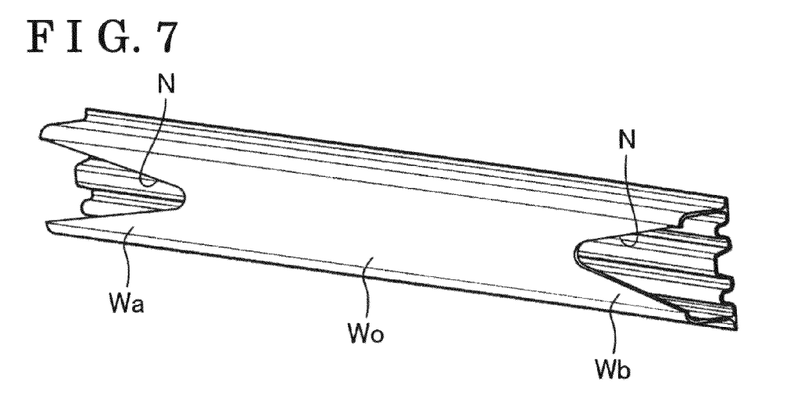
FIG. 7 is a perspective view illustrating a state where a predetermined cut-out is formed at each of the end portions of the raw material of the bumper reinforcement according to the embodiment, at a portion of each of the end portions facing the vehicle body side.
Figure 8:
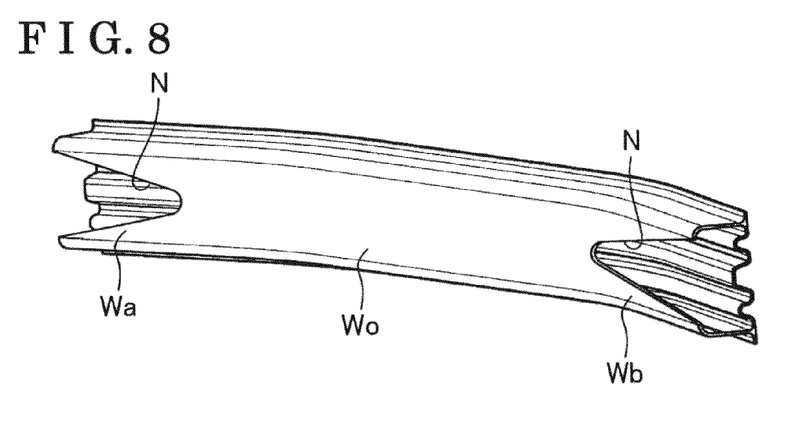
FIG. 8 is a perspective view illustrating a state where each of the end portions of the bumper reinforcement according to the embodiment is bent toward a vehicle body side.
Figure 9:
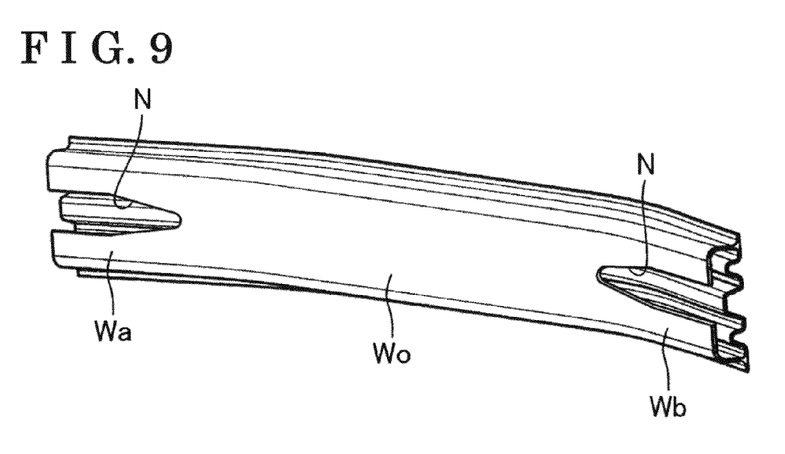
FIG. 9 is a perspective view illustrating a state where each of the end portions of the bumper reinforcement according to the embodiment is formed to include a predetermined configuration where gradual change is added.

The bumper reinforcement 10 is manufactured through a first process, a second process, a third process, a fourth process and a fifth process. In the first process, an aluminum alloy extruded material Wo (a raw material) serving as a light alloy extruded material is prepared to be at a predetermined length L (commonly, the raw material is set at the predetermined length by means of cutting) (refer to FIG. 6). The aluminum alloy extruded material Wo includes a hollow and closed cross-section in a vertical section. After the first process, a cut-out N including a predetermined shape (for example, a V-shaped cut-out in the vehicle width direction) is formed at a portion of the vehicle body side of each of end portions Wa, Wb of the aluminum alloy extruded material Wo in the second process (refer to FIG. 7). After the second process, each of the end portions Wa, Wb of the aluminum alloy extruded material Wo is bent toward the vehicle body side by performing a bending process in the third process (refer to FIG. 8). After the third process, each of the end portions Wa, Wb of the aluminum alloy extruded material Wo is formed to include the a predetermined configuration (so that the thickness T of the hollow cross-section of each of the end portions Wa, Wb in the vehicle front-rear direction is gradually changed, that is, gradually reduced toward the end of each of the end portions Wa, Wb) in the fourth process (refer to FIG. 9). After the fourth process, the bolt insertion holes 11, 12 and the bolt attaching holes 13, 14 are provided at each of the end portions Wa, Wb of the aluminum alloy extruded material Wo in the fifth process (refer to FIG. 10). In the fourth process, the vertical wall B1 and the vertical wall B2 which are positioned above and below the opening A respectively are pressed so that the vertical walls B1 and B2 in a state where the vertical walls B1 and B2 are drawn in the imaginary line are pressed to be in a state where the vertical walls B1 and B2 are drawn in the solid line as illustrated in FIG. 5. The manufacturing processes of the bumper reinforcement 10 are schematically illustrated in FIGS. 6 to 10, and therefore the shape and configuration of, for example, the raw material (Wo) illustrated in FIGS. 6 to 10 may be different from the shape and configuration of the bumper reinforcement 10 illustrated in FIGS. 1 to 5.

According to the bumper reinforcement 10 of the embodiment, during the bending process where each of the end portions Wa, Wb of the raw material Wo is bent toward the vehicle body side (during the third process), the cut-out N formed in the second process functions effectively, thereby facilitating the bending process. Thus, an inclined surface (that is, a shape of a portion that is bent in the bending process) corresponding to design of the vehicle is easily obtained. In addition, a deterioration of strength that may be caused by the cut-out N (that is, the opening A) formed at the raw material Wo is compensated for by restricting the openings A from being expanded because the openings A are configured to be at least partially closed with the respective vertical plate portions 23c, 33c of the bumper attaching portions 23, 33 of the crush boxes 20, 30 that are assembled on the portions that are bent in the bending process. The hollow cross-section of the intermediate portion 10c of the bumper reinforcement 10 corresponds to the closed cross-section and a shape of the closed cross-section of the intermediate portion 10c is uniform in the lengthwise direction thereof. Accordingly, strength of the intermediate portion 10c is appropriately ensured.

According to the bumper reinforcement 10 of the embodiment, a vehicle outer side of each of the end portions Wa, Wb is formed into a bent configuration in the bending process, however, an outer shape and configuration thereof maintains an outer shape of the raw material Wo, and therefore deterioration of the shape is not caused. In addition, the bumper reinforcement 10 may be manufactured by processing the raw material Wo (for example, by cutting, by forming the cut-out thereat, by bending and/or by applying the gradual change of the thickness) without need for a separate member, that is, a member provided separately from the raw material Wo, and thus, there is no need to join the separate member to the raw material Wo. Accordingly, the number of parts is reduced, and a manufacturing work load is reduced (by eliminating a joining process for joining the raw material and the separate member to each other), leading to cost reduction.

According to the bumper reinforcement 10 of the embodiment, at portions of the bumper reinforcement 10 at which the bumper reinforcement 10 is attached to the crush boxes 20, 30, the upper wall portion 10d and the lower wall portion 10e of the bumper reinforcement 10 are retained (in the sandwiched manner) by the upper plate portions 23a, 33a (each serving as the retaining portion) and the lower plate portions 23b, 33b (each serving as the retaining portion). Thus, for example, at a small overlap impact or an off-set collision, torsion occurring to the bumper reinforcement 10 is restricted by the crush boxes 20, 30. Accordingly, functions (strength) of the bumper reinforcement 10 may be enhanced.

According to the embodiment, the bumper reinforcement 10 is configured to be assembled on the side members of the vehicle body via the crush boxes 20, 30 and be supported by the crush boxes 20, 30 (that is, the crush boxes 20, 30 are configured to serve as supporting members of the bumper reinforcement 10). However, the bumper reinforcement 10 may be configured to be assembled directly on the side members of the vehicle (that is, the side members of the vehicle are configured to serve as the supporting members of the bumper reinforcement 10). According to the embodiment, the bumper reinforcement 10 is configured to be assembled on the crush boxes 20, 30 by means of the bolts 41 and the nuts 42. However, an assembly structure of the bumper reinforcement and the supporting member may be appropriately changed so that the bumper reinforcement is attached to the supporting member by welding, for example.

According to the bumper reinforcement 10 of the embodiment, the bumper reinforcement 10 is made of the aluminum alloy, however, the bumper reinforcement 10 may be made of light metal alloy, for example, magnesium alloy. According to the embodiment, the bumper reinforcement is applied to the vehicle bumper apparatus mounted on the front side of the vehicle, however, the bumper reinforcement of the embodiment may be applied to the vehicle bumper apparatus mounted at the rear side of the vehicle, in a similar manner to that explained in the embodiment or in a modified manner.

The bumper reinforcement 10 of this embodiment is manufactured through, for example, the first process, the second process, the third process and the fourth process. In the first process, the aluminum alloy extruded material Wo (the raw material) including the hollow cross-section is prepared to be at the predetermined length L (commonly, the raw material is set at the predetermined length by means of cutting). After the first process, the cut-out N including the predetermined shape is formed at a portion of the vehicle outer side of each of the end portions Wa, Wb of the aluminum alloy extruded material Wo in the second process. After the second process, each of the end portions Wa, Wb of the aluminum alloy extruded material Wo is bent toward the vehicle body side by performing the bending process in the third process. After the third process, each of the end portions Wa, Wb of the aluminum alloy extruded material Wo is formed to include the predetermined configuration where the gradual change is added (so that the thickness T of the hollow cross-section of each of the end portions Wa, Wb in the vehicle front-rear direction is gradually changed so that the thickness T is reduced toward the end of each of the end portions Wa, Wb) in the fourth process.

According to the embodiment, the bumper reinforcement 10 includes the end portions 10a, 10b and the intermediate portion 10c provided between the end portions 10a, 10b, wherein the bumper reinforcement 10 is made of the aluminum alloy extruded material Wo including the hollow cross-section and is configured to be arranged at the vehicle to be extended in the vehicle width direction, the bumper reinforcement 10 is configured to be assembled on and supported by the crush boxes 20, 30 at each of the end portions 10a, 10b bent toward the vehicle body side, the hollow cross-section of aluminum alloy extruded material Wo includes the closed cross-section at the intermediate portion 10c and includes the open cross-section provided with the opening A formed at the vehicle body side of the hollow cross-section at each of the end portions 10a, 10b, each of the end portions 10a, 10b is formed in a manner that the thickness T of the hollow cross-section of each of the end portions 10a, 10b in the vehicle front-rear direction is gradually reduced toward the end of each of the end portion 10a, 10b, and each of the openings A is configured to be at least partially closed with the vertical plate portion 23c, 33c of the crush box 20, 30 and is restricted from being expanded.

According to the above described structure, when each of the end portions 10a, 10b of the bumper reinforcement 10 is bent toward the vehicle body side, the opening A functions effectively, thereby facilitating the bending process. Thus, the inclined surface corresponding to the design of the vehicle is easily obtained. In addition, the deterioration of strength that may be caused by the opening A formed at the bumper reinforcement 10 is compensated for by restricting opening A from being expanded because the opening A is configured to be at least partially closed with the vertical plate portions 23c, 33c of the crush boxes 20, 30 that are assembled on the respective bent portions. The hollow cross-section of the intermediate portion 10c of the bumper reinforcement 10 corresponds to the closed cross-section, and thus the strength of the intermediate portion 10c is appropriately ensured.

According to the above described structure, the vehicle outer side of each of the end portions 10a, 10b is formed into the bent configuration in the bending process, however, the outer shape thereof maintains the outer shape of the raw material Wo, and therefore the deterioration of the shape is not caused. In addition, the bumper reinforcement 10 may be manufactured by processing the raw material Wo (for example, by cutting, by forming the opening A, by bending, by adding the gradual change) without need for the separate member, that is, the member provided separately from the raw material Wo, and thus, there is no need to join the separate member to the row material Wo. Accordingly, the number of parts is reduced, and the manufacturing work load is reduced (by eliminating the joining process for joining the row material Wo and the separate member to each other), leading to the cost reduction.

According to the embodiment, the bumper reinforcement 10 further includes the upper wall portion 10d and the lower wall portion 10e, wherein the upper wall portion 10d and the lower wall portion 10e are configured to be retained by the upper plate portion 23a, 33a and the lower plate portion 23b, 33b of the respective crush boxes 20, 30 at the portions of the bumper reinforcement 10 at which the bumper reinforcement 10 is assembled on the crush boxes 20, 30.

According to the above described structure, at the portions of the bumper reinforcement 10 at which the bumper reinforcement 10 is attached to the crush boxes 20, 30, the upper wall portion 10d and the lower wall portion 10e of the bumper reinforcement 10 are retained by the upper plate portions 23a, 33a (each serving as the retaining portion) and the lower plate portions 23b, 33b (each serving as the retaining portion). In this case, at the small overlap impact or the off-set collision, the torsion is restricted by the crush boxes 20, 30 from occurring to the bumper reinforcement 10. Accordingly, the functions of the bumper reinforcement 10 may be enhanced.

According to the embodiment, the shape of the closed cross-section of the intermediate portion 10c is uniform in the lengthwise direction of the intermediate portion 10c.

According to the above described structure, the strength of the intermediate portion 10c is appropriately ensured.

According to another aspect of this disclosure, the vehicle bumper apparatus 100 includes the bumper reinforcement 10 and the crush boxes 20, 30, wherein the bumper reinforcement 10 is made of the aluminum alloy extruded material Wo including the hollow cross-section and configured to be arranged at the vehicle to be extended in the vehicle width direction, the bumper reinforcement 10 includes the end portions 10a, 10b each of which is bent toward the vehicle body side, the end portions 10a, 10b of the bumper reinforcement 10 are configured to be assembled on the vehicle body via the crush boxes 20, 30, the hollow cross-section of the aluminum alloy extruded material Wo of the bumper reinforcement 10 includes the closed cross-section at the intermediate portion 10c provided between the end portions 10a, 10b and includes the open cross-section provided with the opening A formed at the vehicle body side of the hollow cross-section at each of the end portions 10a, 10b, each of the end portions 10a, 10b is formed in a manner that the thickness T of the hollow cross-section of each of the end portions 10a, 10b in the vehicle front-rear direction is gradually reduced toward the end of each of the end portion 10a, 10b, and the crush boxes 20, 30 include the vertical plate portions 23c, 33c, and each of the openings A of the bumper reinforcement 10 is at least partially closed with the vertical plate portion 23c, 33c and is restricted from being expanded.

According to the above described structure, when each of the end portions 10a, 10b of the bumper reinforcement 10 is bent toward the vehicle body side, the opening A functions effectively, thereby facilitating the bending process. Thus, the inclined surface corresponding to the design of the vehicle is easily obtained. In addition, the deterioration of strength that may be caused by the opening A formed at the bumper reinforcement 10 is compensated for by restricting opening A from being expanded because the opening A is at least partially closed with the vertical plate portions 23c, 33c of the crush boxes 20, 30 that are assembled on the respective bent portions. The hollow cross-section of the intermediate portion 10c of the bumper reinforcement 10 corresponds to the closed cross-section, and thus the strength of the intermediate portion 10c is appropriately ensured.

According to the above described structure, the vehicle outer side of each of the end portions 10a, 10b is formed into the bent configuration in the bending process, however, the outer shape thereof maintains the outer shape of the raw material Wo, and therefore the deterioration of the shape is not caused. In addition, the bumper reinforcement 10 may be manufactured by processing the raw material Wo (for example, by cutting, by forming the opening A, by bending, by adding the gradual change) without need for the separate member, that is, the member provided separately from the raw material Wo, and thus, there is no need to join the separate member to the row material Wo. Accordingly, the number of parts is reduced, and the manufacturing work load is reduced (by eliminating the joining process for joining the row material Wo and the separate member to each other), leading to the cost reduction.

According to the embodiment, the crush boxes 20, 30 include the upper plate portion 23a, 33a conforming to the upper wall portion 10d of the bumper reinforcement 10 which corresponds to the upper surface of the bumper reinforcement 10 and the lower plate portion 23b, 33b conforming to the lower wall portion 10e of the bumper reinforcement 10 which corresponds to the lower surface of the bumper reinforcement 10, and the upper wall portion 10d and the lower wall portion 10e of the bumper reinforcement 10 are retained at the upper plate portion 23a, 33a and the lower plate portion 23b, 33b of the crush boxes 20, 30 in a manner that the upper wall portion 10d and the lower wall portion 10e are sandwiched between the upper plate portion 23a, 33a and the lower plate portion 23b, 33b.

According to the above described structure, for example, at the small overlap impact or the off-set collision, the torsion occurring to the bumper reinforcement 10 is restricted by the crush boxes 20, 30. Accordingly, the functions (strength) of the bumper reinforcement 10 may be enhanced.

According to the embodiment, the shape of the closed cross-section of the intermediate portion 10c of the bumper reinforcement 10 is uniform in the lengthwise direction of the intermediate portion 10c.

According to the above described structure, the strength of the intermediate portion 10c is appropriately ensured.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A bumper reinforcement comprising:
end portions and
an intermediate portion provided between the end portions, wherein
the bumper reinforcement is made of a single section light alloy extruded material including a hollow cross-section and is configured to be arranged at a vehicle to be extended in a vehicle width direction, the bumper reinforcement is configured to be assembled on and supported by a supporting member at each of the end portions bent toward a vehicle body side,
the hollow cross-section of the light alloy extruded material includes a closed cross-section at the intermediate portion and includes an open cross-section provided with an opening formed at the vehicle body side of the hollow cross-section at each of the end portions,
each of the end portions is formed in a manner that a thickness of the hollow cross-section of each of the end portions in a vehicle front-rear direction is gradually reduced toward an end of each of the end portion,
each of the openings is configured to be at least partially closed with a connecting portion of the supporting member and is restricted from being expanded,
the openings facilitate processing for gradually reducing, by bending, the thickness of the end portions, and
a width of the opening is reduced by the processing by gradually reducing the thickness of the end portions.

2. The bumper reinforcement according to claim 1, further comprising:
an upper wall portion and a lower wall portion, wherein
the upper wall portion and the lower wall portion are configured to be retained by a retaining portion of the respective supporting members at each portion of the bumper reinforcement at which the bumper reinforcement is assembled on the supporting members.

3. The bumper reinforcement according to claim 1, wherein a shape of the closed cross-section of the intermediate portion is uniform in a lengthwise direction of the intermediate portion.

4. A vehicle bumper apparatus comprising:
a bumper reinforcement and
a supporting member, wherein
the bumper reinforcement is made of a single section light alloy extruded material including a hollow cross-section and configured to be arranged at a vehicle to be extended in a vehicle width direction, the bumper reinforcement includes end portions each of which is bent toward a vehicle body side, the end portions of the bumper reinforcement are configured to be assembled on the vehicle body via the supporting member,
the hollow cross-section of the light alloy extruded material of the bumper reinforcement includes a closed cross-section at an intermediate portion provided between the end portions and includes an open cross-section provided with an opening formed at the vehicle body side of the hollow cross-section at each of the end portions,
each of the end portions is formed in a manner that a thickness of the hollow cross-section of each of the end portions in a vehicle front-rear direction is gradually reduced toward an end of each of the end portion,
the supporting member includes a connecting portion, and each of the openings of the bumper reinforcement is at least partially closed with the connecting portion and is restricted from being expanded,
the openings facilitate processing for gradually reducing, by bending, the thickness of the end portions, and
a width of the opening is reduced by the processing by gradually reducing the thickness of the end portions.

5. The vehicle bumper apparatus according to claim 4, wherein
the supporting member includes an upper plate portion conforming to an upper wall portion of the bumper reinforcement which corresponds to an upper surface of the bumper reinforcement and a lower plate portion conforming to a lower wall portion of the bumper reinforcement which corresponds to a lower surface of the bumper reinforcement, and
the upper wall portion and the lower wall portion of the bumper reinforcement are retained at the upper plate portion and the lower plate portion of the supporting member in a manner that the upper wall portion and the lower wall portion are sandwiched between the upper plate portion and the lower plate portion.

6. The vehicle bumper apparatus according to claim 4, wherein a shape of the closed cross-section of the intermediate portion of the bumper reinforcement is uniform in a lengthwise direction of the intermediate portion.

* * * * *